Jan. 28, 1936.    R. B. BIRGE    2,029,050
CONVERTIBLE SEDAN AND PHAETON
Filed June 27, 1930    3 Sheets-Sheet 3
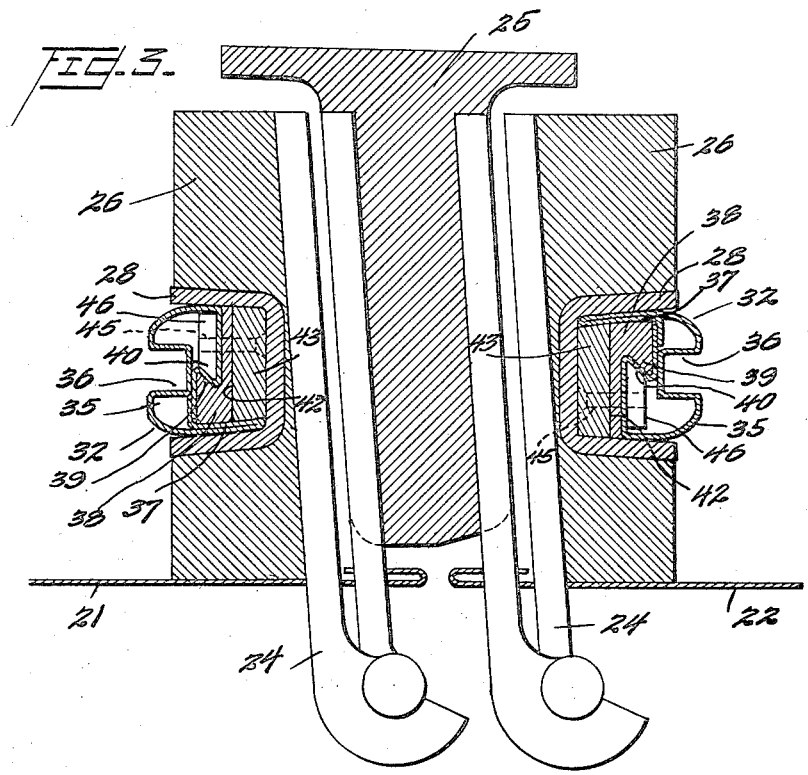
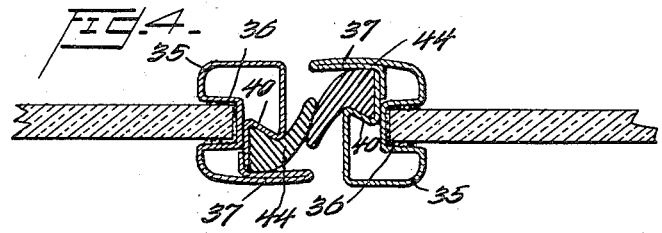
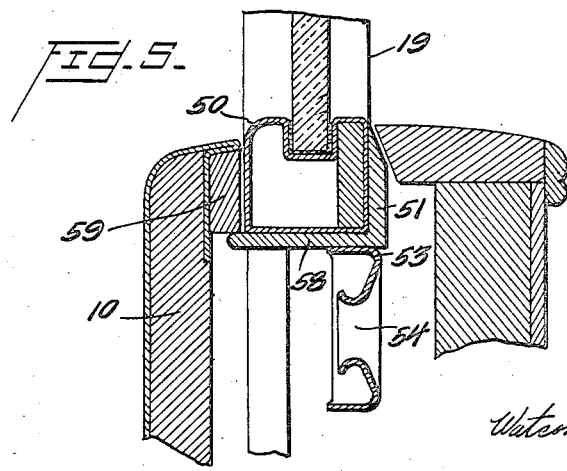
Inventor
Raymond B. Birge
Watson, Cole, Morse & Kindle
Attorney Patented Jan. 28, 1936

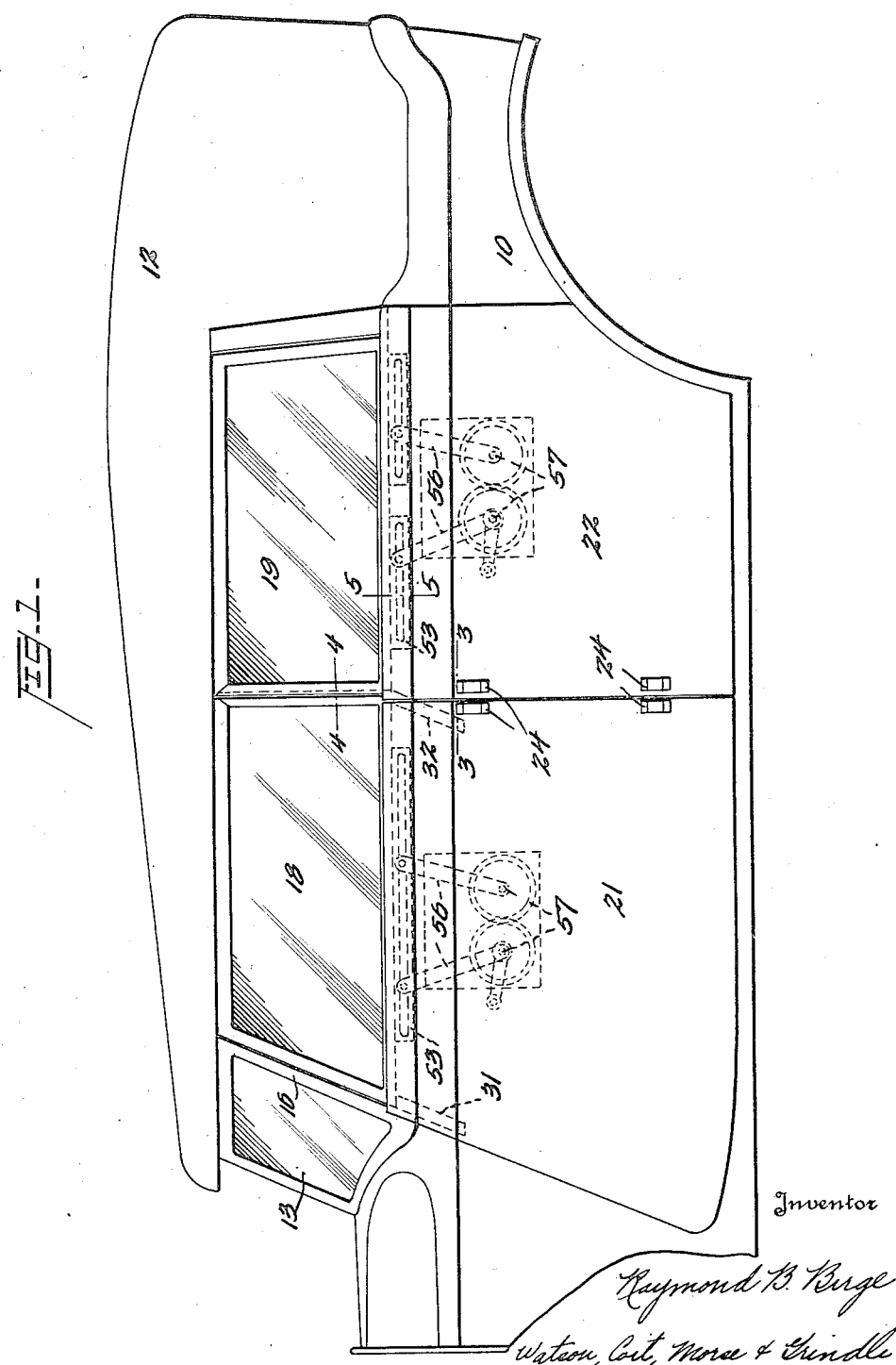

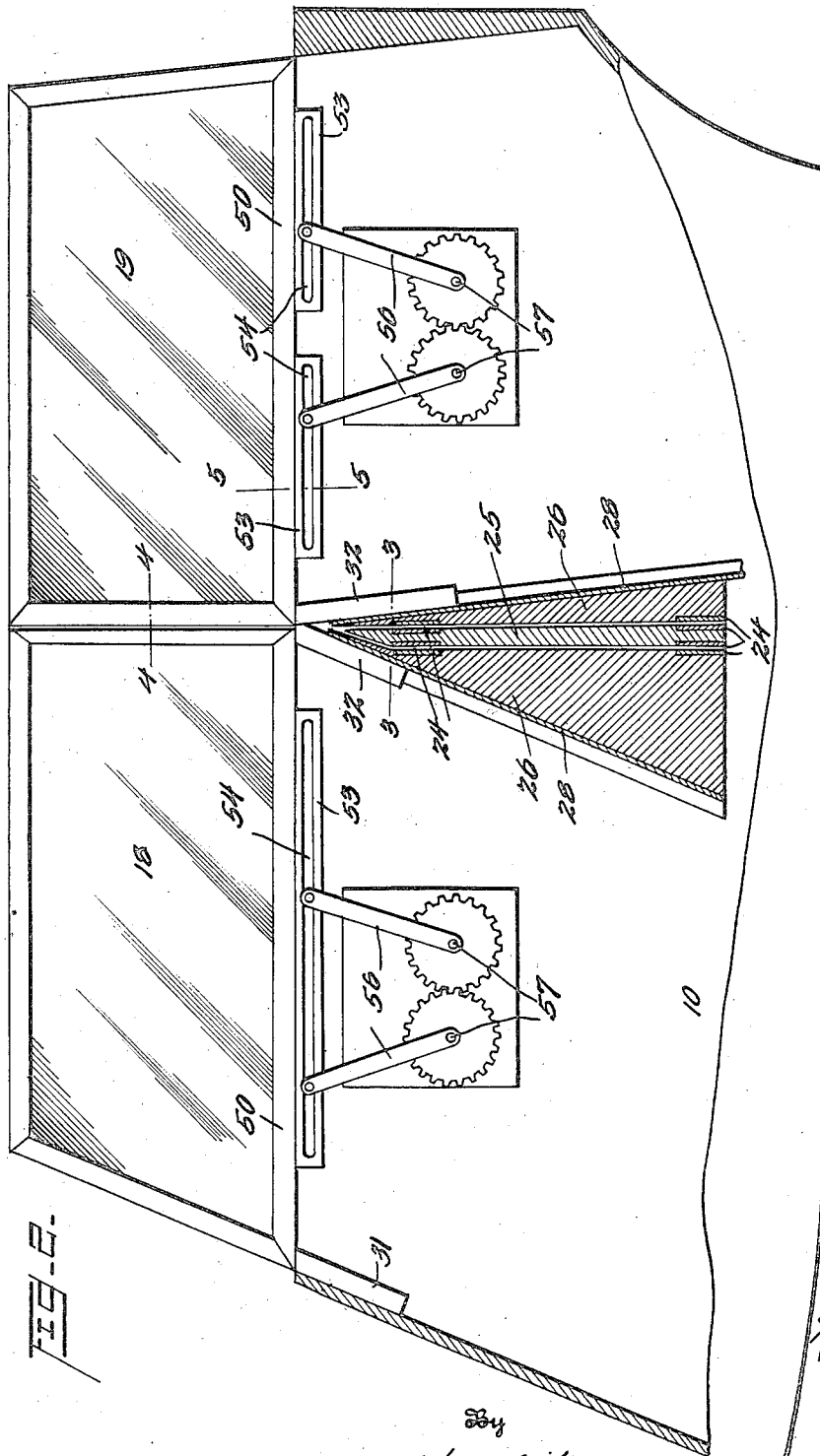

2,029,050

UNITED STATES PATENT OFFICE 2,029,050

CONVERTIBLE SEDAN AND PHAETON

Raymond B. Birge, Detroit, Mich., assignor to Packard Motor Car Company, Detroit, Mich., a corporation of Michigan Application June 27, 1930, Serial No. 464,285

18 Claims. (Cl. 296—45)

This invention relates to bodies for vehicles and is particularly concerned with that type of vehicle body which is described as convertible and in which the advantageous features of both the closed and open type of bodies are combined by means of a construction which conveniently permits alteration of the body from one type to the other.

Convertible bodies are ordinarily provided with a collapsible top which may be folded back on the body in pleasant weather and with windows which may be raised and lowered and which may form with the top, when the latter is extended, the customary closed body.

In vehicle bodies having more than one window on each side, as in the coach or sedan, it is the usual practice to provide pillars intermediate the windows extending to the vehicle top, these pillars serving as guides in which the windows are slidably mounted for movement to raised and lowered position and also serving as supports for the hinging of doors. When the body is converted to the phaeton type by folding or collapsing the vehicle top, some disposition must be made of that portion of the pillar extending above the body proper which would otherwise seriously detract from the appearance of the open body. A construction in which these pillars are collapsible or are arranged to fold into the tonneau is objectionable by reason of the difficulties encountered in designing a sturdy structure and one which will not rapidly become loose and noisy. A detachable pillar is open to the same objection and is also liable to become damaged or lost while removed. With either arrangement the pillar is in the way when the vehicle is converted to the phaeton form and materially increases the difficulty of conversion.

It is therefore an object of the present invention to eliminate that portion of the conventional pillar intermediate the vehicle windows which extends above the main frame of the body.

A further object of the invention is the provision of means carried by one or both windows and presenting a panelled appearance similar to that afforded by the usual intermediate pillar, when the windows are raised.

It will be appreciated that the lower portion of the pillar cannot ordinarily be dispensed with since it serves to complete the door frame; furthermore, it is sometimes desirable to hinge one or more of the doors on this pillar. The present invention therefore contemplates the provision of means whereby the windows may be raised or lowered in such manner as to clear the pillar when in the lower position and to completely fill the space above the pillar when raised.

A more specific object of the invention is the provision in a vehicle body of adjacent windows which substantially abut in the raised position and which are lowered in a direction at an angle to the vertical and away from each other to accommodate a frame member therebetween in the lowered position.

A further object of the invention is to provide a vehicle body having a slanting windshield and having side supports for the windshield of substantially uniform width in the direction of the length of the vehicle, together with forward windows abutting the windshield supports and arranged to slide at an angle to the vertical so that contact between the windshield supports and the windows may be maintained in all positions of elevation of the latter.

Further objects and features of the invention will be apparent from the following description taken in connection with the accompanying drawings in which Figure 1 is a perspective view of a vehicle body illustrating one embodiment of the present invention;

Figure 2 is a vertical longitudinal sectional view of the body shown in Figure 1;

Figure 3 is a section on the line 3—3 of Figure 2;

Figure 4 is a section on the line 4—4 of Figure 2; and

Figure 5 is a section on the line 5—5 of Figure 2.

The invention has been illustrated as applied to the usual sedan type of vehicle body in which two doors hinged centrally of the body are provided, since it is this construction which is probably the most difficult to design for ready conversion to the phaeton type, but it will be appreciated that the principles of the invention are applicable to other types of bodies and that some features of the invention are useful in bodies which are not designed nor intended for conversion.

Referring specifically to the drawings, it will be seen that the body is indicated generally at 10 and is provided with a top 12, preferably of the collapsible type. The usual slanting windshield 13 is supported in a suitable frame which includes side frame members 16 of uniform width in the direction of the length of the vehicle body. In Figure 1 the parts are shown in the position which they would normally occupy during inclement weather; the front and rear windows, designated 18 and 19 respectively, are raised and, together with the windshield and top, completely enclose the interior of the body. As is customary in the sedan body, these windows are mounted to slide in the doors 21 and 22 which are swingably mounted on a central pillar 25 by means of hinges 24 as shown in Figure 3 of the drawings. The adjacent frame members 26 of the doors, to which the hinges 24 are secured, are provided with guide elements 28, preferably U-shaped in section, in which the windows are slidable, that face of each member 26 in which the guide elements are mounted being inclined to the vertical as illustrated in Figure 2 of the drawings. It will thus be observed that as the windows are lowered they are constrained to follow divergent paths to thereby clear the pillar 25.

Each window pane is carried in a substantially trapezoidal sash having extensions 31 and 32 adjacent the lower corners, these extensions being preferably integral with the corresponding sides of the sash. The inner or adjacent extensions 32 of the window sash are formed as shown in Figure 3 of the drawings and are arranged to slide within the guides 28 provided in the corresponding doors. A strip 35 of sheet metal, bent so as to provide a recessed portion 36 to receive the window pane and to form an inwardly and outwardly directed flange 37 which affords a surface for engagement with one leg of the guide 28, constitutes the principal member of each extension 32 and the corresponding side of the window sash. An element 38 having a wedge shaped portion 39 is retained in position on the member 35 by the re-entrant portion 40 of that member and is provided with a flat face 42 on which a wear plate 43, preferably of bakelite or other wear resistant material, may be secured. This wear plate is preferably clamped in position by means of screws 45, extending through the plate and the member 39, and threaded into nuts 46 shaped to conform to the portions of the sheet metal member 35 with which they engage.

The purpose of shaping the sheet metal member 35 in the manner indicated in Figure 3 will be more apparent from an inspection of Figure 4 in which a section through the adjacent sides of the window sashes is shown. As mentioned hereinbefore, the sides of the window sashes are preferably integral with the extensions 31 and 32, and the recessed portion 36 of each member 35 is arranged to receive the window glass. The re-entrant portion 40 of the member 35 serves to grip a strip 44 of resilient material such as rubber, this strip being substantially wedge shape in cross-section. Figure 4 illustrates the nature of the seal between the two adjacent window sashes in the raised position of the windows, and it will be seen that the strips 44 cooperate to completely close the space between the windows. The sides of the window sashes adjacent each end of the vehicle body and the corresponding extensions 31 may be formed in any suitable manner and are arranged to slide in cooperating guides in the corresponding doors, the specific construction of these members constituting no part of the present invention. It will nevertheless be observed that by reason of the inclined movement of the windows during raising and lowering thereof, the side frame members 16, in which the windshield is mounted, may be engaged with a tight fit by the window sash in any position of the window without necessitating any enlargement in width of the base of the member 16 such as is required with the vertically moving window. In this manner the width of the frame member 16 in the direction of the length of the body may be materially reduced and increased vision afforded.

The window may be supported and elevated or depressed by any conventional mechanism. In Figure 5 the lower section of the window sash 50 is illustrated as carried by an L-shaped member 51 which is in turn secured to a sheet metal strip 53 having a slot 54 punched or stamped therein for engagement by a suitable actuating mechanism such, for instance, as the levers 56. These levers may be pivotally supported as at 57 and rotated by any suitable gearing to elevate or depress the window. When the window is elevated, the lower leg 58 of the L-shaped member 51 engages a strip 59 of rubber or similar material to effect the sealing of the lower portion of the sash against the door body.

It may be noted that the invention may be carried out, as illustrated herein, without departing from the conventional and convenient practice involving the bodily shifting of the windows from raised to lowered position by the use of guides, whereby the window may be lowered to any desired extent and retained in partially opened position without the provision of special devices to prevent rattling. This type of window may be generally designated as sliding, the term being intended to distinguish over a hinged or pivoted construction and to include any bodily shiftable window regardless of whether the friction developed on moving the window is reduced by the use of rollers or other antifriction devices.

It will be appreciated that the construction hereinbefore described obviates many of the disadvantages inherent in prior convertible vehicle bodies by reason of the elimination of the upper portion of the central pillar. Furthermore, the construction is such that the lower portion 25 of the pillar, the portion 26 of the door frame, and the hinges need not be accommodated in the small space provided between the usual vertically sliding windows and may therefore be made larger and sturdier. The body may be readily converted from the closed to the open type by simply lowering the windows and collapsing the top.

While the invention has been specifically described with relation to a single embodiment of the principles thereof, it will be understood that the construction details may be varied to a considerable extent and that all such changes and alterations are contemplated as fall within the spirit and scope of the appended claims.

Having thus described the invention, what is claimed as new and desired to be secured by Letters Patent is:

1. In a vehicle body, the combination with a windshield, of a frame for supporting said windshield in a plane inclined to the vertical, a window having an edge portion arranged to engage the windshield frame, means for raising and lowering said window in a direction parallel to the plane of the windshield to maintain engagement between the windshield frame and the window, and means defining the window opening and including a portion of the windshield frame and a substantially vertical member at the rear of the opening, said window being dimensioned to completely fill the opening when in raised position.

2. In a vehicle body, the combination with a pillar, of a door hingedly supported on said pillar, a window supported within said door and guides inclined to the vertical for supporting said window for sliding movement in a line or path into a position in which a portion of the window is disposed above and over said pillar.

3. In a vehicle body, the combination with a pillar, of a door hingedly supported on said pillar, a window carried by said door, and guides within said door to support said window for movement to raised and lowered positions, said guides being inclined from the lower to the upper end thereof toward said pillar, whereby the window in its raised position may project above and over a portion of said pillar.

4. In a vehicle body, the combination with a pair of adjacent windows, of a frame for supporting said windows for movement to raised and lowered positions, said frame including an intermediate structural member interposed between said windows in the lowered position of the latter, and means for guiding said windows for sliding movement in linear upwardly converging paths to cause the windows to substantially abut in the raised position.

5. In a vehicle body, the combination with a supporting pillar, of doors hingedly mounted on said pillar, windows supported in said doors for movement to raised and lowered positions, and means for guiding said windows for sliding movement in upwardly convergent linear paths from positions on either side of said pillar to the raised position in which the windows substantially abut.

6. In a convertible vehicle body, the combination with a frame, of a collapsible top supported above said frame, a pillar associated with said frame, doors hingedly connected to said pillar, said pillar and doors terminating substantially midway between said top and the lower portion of said frame, and windows carried by said doors for sliding movement in upwardly convergent linear paths to raised and lowered positions, said windows being provided on their adjacent sides with frame members which substantially abut in the raised position of the windows to form in effect a continuation of said pillar to the top and which are lowered with said windows to afford a clear space above the doors from the front to the rear of the body.

7. In a sliding window construction, the combination with a window pane, of a sheet metal member bent to provide reentrant portions on opposite sides thereof when viewed in cross-section, one of said reentrant portions serving to receive said pane, and resilient means serving as a seal for the window carried within the second of said reentrant portions, said member having a portion thereof extending appreciably beyond said pane, and means carried by said extended portion of said member and projecting within the second of said reentrant portions constituting a guide for the window.

8. In a window construction, the combination with a pair of contiguous frames, of windows movable to raised and lowered positions and lying entirely within the confines of said frames in the lowered position, guide members associated with the adjacent edges of said windows, said guide members being rigidly secured to and movable with said windows and substantially abutting in the raised position of the windows.

9. In a vehicle body, the combination with an inclined windshield, of a frame, a window carried by said frame, means for lowering and raising said window, means for constraining said window to move in a path having an inclination to the vertical substantially equal to that of the windshield, and means defining the window opening, said last named means including a substantially vertical member at the rear of the opening, said window being dimensioned to lie in abutting relation to said vertical member and to completely close said opening when in raised position.

10. In a vehicle body, the combination with an inclined windshield, of a frame arranged to receive a window therein, means for elevating said window above the frame, means within the frame for guiding the said window in a substantially vertical plane and in a path inclined to the vertical and parallel to the windshield, and means defining the window opening, said last named means including a substantially vertical member at the rear of the opening, said window being dimensioned to completely close said opening when in raised position.

11. In a vehicle body, the combination with an inclined windshield, of a frame for supporting said windshield, said frame including side members of uniform depth measured longitudinally of the vehicle, a window having an edge portion arranged to engage the windshield frame, means for raising and lowering said window in a direction parallel to the plane of the windshield to maintain engagement between the windshield frame and the window, and means defining the window opening and including the adjacent side member of the windshield frame and a substantially vertical member at the rear of the opening, said window being dimensioned to lie in abutting relation to said vertical member and to completely fill the opening when in raised position.

12. In a vehicle body construction, the combination of a door post, a pair of doors hinged to said post, a pair of parallel glass run channels in each of said doors, each pair of channels being inclined with respect to the vertical, and windows in said glass run channels, said windows being arranged to contact with each other and from a closure when in fully raised position.

13. In a vehicle body, the combination with a pair of adjacent windows, of a frame for supporting said windows for movement to raised and lowered positions, said frame including an intermediate structural member interposed between said windows in the lowered position of the latter, and means for guiding said windows for sliding movement in straight relatively inclined paths converging upwardly to cause the windows to substantially abut along the major part of the adjacent edge portions thereof above and over said structural member.

14. In a vehicle body, the combination with a pillar, of a door hingedly supported on and disposed at one side of said pillar, said door having a window pocket therein open at the upper side, a frame affording a second window pocket open at the upper side and disposed at the opposite side of said pillar, structural means affording a continuous window opening over said door and said frame, windows movable from lowered positions within said pockets and on opposite sides of said pillar to raised positions into said opening to close the latter, and guide means constraining said windows for movement in converging straight line paths from the lowered positions to the raised positions to cause the windows to substantially abut over said pillar.

15. In a vehicle body, the combination with a pillar, of a frame located adjacent said pillar, and a window supported for bodily movement in a straight line only within said frame from a position in a common longitudinal vertical plane with and alongside said pillar into a position in which a portion of the window is disposed above and over the top of the pillar, the path of movement of said window having vertical and horizontal components lying substantially in the said plane.

16. In a vehicle body, the combination with a pair of adjacent windows, of a frame for supporting said windows for movement to raised and lowered positions, said frame including an intermediate structural member interposed between said windows in the lowered position of the latter, and means for guiding said windows for sliding movement in separate upwardly converging straight line paths both of which are inclined with respect to the vertical in a longitudinal vertical plane to cause the windows to substantially abut in edge to edge relation above said structural member in the raised position of the windows.

17. In a vehicle body, the combination with a pair of adjacent windows, of a frame for supporting said windows for movement to raised and lowered positions, said frame including an intermediate structural member interposed between said windows in the lowered position of the latter, and means for guiding said windows for sliding movement in separate upwardly converging straight line paths both of which are inclined with respect to the vertical to cause the windows to substantially abut in edge to edge relation above said structural member in the raised position of the windows, said means including separate pairs of straight parallel guide members fixed to said frame and disposed at opposite sides of the respective windows in the lowered position of the latter, the guide members for each window being inclined to the vertical in the plane of the window and constituting the sole means for constraining the windows to movement in straight, upwardly converging paths.

18. In a motor vehicle, the combination with a body structure defining adjacent front and rear door openings and a single uninterrupted window opening above both said door openings and including a pillar intermediate said door openings, of doors supported on said pillar for swinging movement into and out of said door openings, each door having a window pocket therein open at the upper side, windows movable from lowered positions within said pockets and fore and aft respectively of said pillar to raised positions into said window opening to close the latter, and means within each pocket supporting the associated windows for sliding movement in converging straight line paths from the lowered positions to the raised positions to cause the windows to abut in edge to edge relation over said pillar.

RAYMOND B. BIRGE.